(12) United States Patent
Hymel

(10) Patent No.: US 6,577,727 B1
(45) Date of Patent: Jun. 10, 2003

(54) ACD TIER BASED ROUTING

(75) Inventor: Darryl Hymel, Batavia, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/510,740

(22) Filed: Feb. 22, 2000

Related U.S. Application Data

(60) Provisional application No. 60/122,280, filed on Mar. 1, 1999.

(51) Int. Cl.[7] .................................................. H04M 3/00
(52) U.S. Cl. .............................. 379/265.05; 379/266.01
(58) Field of Search ....................... 379/265.02, 265.05, 379/265.1, 265.12, 265.14, 266.05, 266.07, 266.08

(56) References Cited

U.S. PATENT DOCUMENTS

| | | | |
|---|---|---|---|
| 4,048,452 A | | 9/1977 | Oehring et al. .............. 379/111 |
| 5,206,903 A | * | 4/1993 | Kohler et al. ........... 379/214.01 |
| 5,335,269 A | | 8/1994 | Steinlicht ................ 379/266.05 |
| 5,586,179 A | * | 12/1996 | Stent et al. .................. 379/242 |

* cited by examiner

*Primary Examiner*—Harry S. Hong
*Assistant Examiner*—Quynh Nguyen
(74) *Attorney, Agent, or Firm*—Welsh & Katz, Ltd.

(57) ABSTRACT

A method is provided for assigning agents of a plurality of agent groups to a agent pool for answering a call based upon a time delay for answering the call. The method includes the steps of designating a first agent group as candidates for answering a call based upon first availability, forming an expanded group of the first group and at least some agents of a second group when the time delay exceeds a threshold and assigning the call to an agent of the expanded group based upon first availability.

23 Claims, 1 Drawing Sheet

ACD TIER BASED ROUTING

This application claims the benefit of provisional application Ser. No. 60/122,280 filed Mar. 1, 1999.

FIELD OF THE INVENTION

The field of the invention relates to telephony systems and more particularly to automatic call distributors used with private networks.

BACKGROUND OF THE INVENTION

Automatic call distribution systems are known. Such systems are typically used in an organizational context as a means of distributing telephone calls among a group of agents of the organization. Agents are typically segregated into groups to serve particular call targets within an organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are considered equal, the automatic call distributor (ACD) may distribute the calls based upon which agent position (telephone) has been idle the longest.

In other systems, where skill is considered essential for call handling, a call may be directed to an agent or group of agents considered the most skilled for the call considered. In these systems, a database of customer records is often maintained. Customers are identified to the ACD and database by features such as automatic number identifier (ANI).

In order to staff an ACD, an organization often relies on historical levels (in Erlangs) of incoming calls to the individual call targets. A manager of the ACD may examine the historical call loading records, add or subtract a percentage of the historical loading based upon a most recent call history (e.g., the most recent week or month), and estimate a staffing level based upon those calculations. Alternatively, some organizations have relied upon commercially available predictive software (i.e., force management packages) which calculates daily staffing levels based upon historic information.

Once daily staffing levels have been estimated, agents are scheduled based upon those estimates. Where more than one organizational call target is involved (e.g., sales agents, service agents, outgoing call campaign agents, etc.), requiring different agent skills, each group is separately staffed based upon an Erlang estimate for that group.

As an alternative to staffing individual groups, some systems group all agents together and assign a skill rating to each agent. Calls are then assigned based upon the skill rating of the agent for handling that type of call.

For example, where a single group is used, an ACD will always look for and assign the call to the most qualified agent. However, some agents are more qualified than others. Because of the differences in qualifications, some agents receive more calls than others, resulting in an inequitable work load.

Further, where all agents are grouped together, an Erlang rate for any one group becomes irrelevant. For example, one benefit of using a common group relates to economies of scale. Two separate groups that separately require 10 agents each would typically only require 18 agents from a common pool of agents.

Further, it is difficult, if not impossible for call center management to known how many agents are serving a particular call target. Because of the difficulty of determining agent loading, it is also difficult to project staffing requirements in a shared agent environment.

Where all agents are grouped together, staffing estimates must be based upon an Erlang rate of the organization as a whole. Basing a staffing estimate upon an organization as a whole is subject to large errors. Because of the importance of call handling through ACDs, a need exists for a method of assigning agents which is more flexible than the individual group method, but which may still be staffed based upon Erlang estimates of the individual call groups.

SUMMARY

A method is provided for assigning agents of a plurality of agent groups to a agent pool for answering a call based upon a time delay in answering the call. The method includes the steps of designating a first agent group as candidates for answering a call based upon first availability, forming an expanded group of the first group and at least some agents of a second group when the time delay exceeds a threshold and assigning the call to an agent of the expanded group based upon first availability.

DETAILED DESCRIPTION OF A PREFERRED EMBODIMENT

Figures 1, 2, 3:
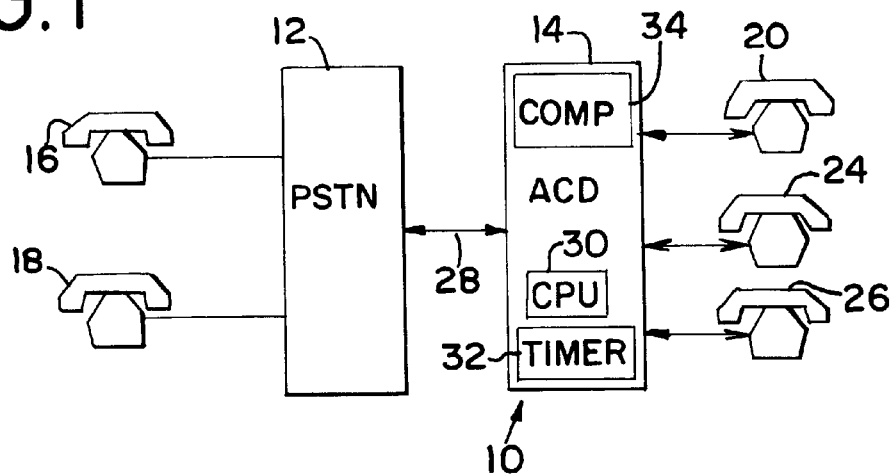
FIG. 1 is a block diagram of an ACD system in accordance with an illustrated embodiment of the invention.
FIG. 2 depicts an agent assignment matrix used by the system of FIG. 1.
FIG. 3 depicts an application tier matrix used by the system of FIG. 1.

FIG. 1 is a block diagram of an ACD system 10, generally, using skill based call routing under an illustrated embodiment of the invention. Under the embodiment, the ACD 14 may receive calls over a number of trunk lines 28 from the PSTN 12 from customers 16, 18 of the ACD 14. Along with the calls, the ACD 14 may receive information about the calls from the PSTN 12. For example, a central processing unit 30 of the ACD 14 may receive an identifier of a caller from an automatic number identification (ANI) service operating from within the PSTN 12. The CPU 30 may also receive information about a dialed number through a dialed number identification (DNIS) service or direct inward dial (DID) information from the PSTN 12.

From the information received from the PSTN 12, the CPU 30 may classify the call for purposes of routing the call to an agent or group of agents. Classification may be based upon a number called or the identity of the caller. For example, the ACD 14 may be owned and operated by a department store. Individual call targets for purposes of classification may include women's clothing, men's clothing, footwear, housewares, appliances, electronics, furniture, hardware, automotive and garden. Other call targets may include catalog sales or technical support for one or more of the other call targets.

Under the illustrated embodiment, each agent is evaluated and assigned to an agent group based upon a skill level for each classification. To further enhance flexibility in agent assignment to calls, a tiering system is used.

FIG. 2 is an agent assignment matrix used in agent assignment. Along the abscissa a number of application numbers are shown. An application number may be used to refer to a particular call handling routine used to process a particular call classification. For example application number 1 may refer to the call handling routine for calls-directed to sales. Application number 2 may refer to a call handling routine for directing calls to service. As used herein application number 1 would direct calls to agents in a first group, application number 2 would direct calls to a second group and so on.

Along the ordinate of the matrix of FIG. 2 is shown identifying numbers of each of a number of agents. Inside the matrix is shown a tier number for each agent with regard to each application. For example, agent number 1 has a tier level of zero for application number 1, a tier level of four for the second application, a tier level of one for the third application, a tier level of two for the forth application, a tier level of three for the fifth application and a tier level of two for the sixth application.

In accordance with the information shown in FIG. 2, agents #2 and #6 form the tier one group of agents with respect to the first application. Agents #4 and #5 form the tier one group for the second application.

Under the illustrated embodiment, calls are first assigned by the CPU 30 (acting as a routing processor) to tier one agents, exclusively. After a time period, when call waiting time exceeds some threshold value, calls may be assigned to agents tier two, three or four.

As used herein call waiting time refers to a delay in answering a call. More specifically a delay in answering a call is measured by the length of time that a call waits in a call queue pending availability of an agent.

FIG. 3 shows an application tiering matrix in accordance with an illustrated embodiment of the invention. As shown in FIG. 3, each application is assumed to have four tiers of agents assigned to the application. The numbers shown inside the application tiering matrix may represent a time period measured by a timer 32 which must pass before agent(s) from another tier are assigned to a call.

For example, application one has a tier one time limit of 5 seconds. Where a call has waited in a queue for less than five seconds, that call would always be assigned to a tier one agent (e.g., agent #2 or #6). Where more than one agent becomes available simultaneously, call assignment may be based upon skill or upon agent idle time (e.g., which agent has been idle the longest).

Where the queue time for a call exceeds 5 seconds (as deducted by a comparator 34) then the tier #1 group of agents for application #1 would be expanded to include tier #2 agents (e.g., agent #5). When the queue time for a call being handled by application #1 exceeds 10 seconds, tier #3 agents would enter the pool for calls being handled by the first application.

A specific embodiment of a method and apparatus for an improved call routing system according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of assigning agents of a plurality of agent groups for answering a call based upon a time delay in answering the call, such method comprising the steps of:

providing in effect an assignment matrix with a plurality of agent identifiers along an ordinate of the matrix and a plurality of application numbers along an abscissa of the matrix where each application number of the plurality of application numbers identifies a call handling routine used to process a corresponding call classification and wherein each column directly below an identifier of an application number of the plurality of application numbers defines a tier number for each agent of the plurality of agents;

designating a first group of agents of the plurality of agents within the assignment matrix as candidates for answering the call based upon first availability where the first group of agents are defined by a tier number of one for the call handling routine of the call;

forming an expanded group of the first group of agents and at least some agents of a second group when the time delay exceeds a first threshold where the second group of agents are defined by a tier number of two for the call handling routine of the call; and assigning the call to an agent of the expanded group based upon first availability.

2. The method of assigning agents as in claim 1 further comprising assigning the call to an agent with a longest period of inactivity when two or more agents of the expanded group become available simultaneously.

3. The method of assigning agents as in claim 1 further comprising assigning the call to an agent with a highest relative skill level in handling a call classification of the call when two or more agents of the expanded group become available simultaneously.

4. The method of assigning agents as in claim 1 further comprising measuring the time delay as being a time interval measured between a current time and a time of arrival of the call from the public switched telephone network.

5. The method of assigning agents as in claim 1 wherein the step of forming the expanded group further comprising comparing the time delay with the first threshold.

6. The method of assigning agents as in claim 1 further comprising further expanding the expanded group of the first and second tiers of agents of the first group to include at least some agents of a third tier of agents of the first agent group when the time delay exceeds a second threshold.

7. The method of assigning agents as in claim 6 further comprising assigning the call to a first available agent of the further expanded group.

8. The method of assigning agents as in claim 7 further comprising assigning the call to an agent with a longest period of inactivity when two or more agents of the further expanded group become available simultaneously.

9. The method of assigning agents as in claim 7 further comprising assigning the call to an agent with a highest relative skill level in handling a call classification of the call when two or more agents of the further expanded group become available simultaneously.

10. An apparatus for assigning agents of a plurality of agents and agent groups for answering a call based upon a time delay in answering the call, such apparatus comprising:

an assignment matrix adapted to identify agents for handling the call, such assignment matrix having a plurality of agent identifiers disposed along an ordinate of the matrix and a plurality of application numbers disposed along an abscissa of the matrix where each application number of the plurality of application numbers identifies a call handling routine used to process a corresponding call classification and wherein each column directly below an identifier of an application number of the plurality of application numbers defines a tier number for each agent of the plurality of agents;

means for designating a first group of agents of the plurality of agents within the assignment matrix as candidates for answering the call based upon first availability where the first group of agents are defined by a tier number of one for the call handling routine of the call;

means for forming an expanded group of the first group of agents and at least some agents of a second group when the time delay exceeds a first threshold where the second group of agents are defined by a tier number of two for the call handling routine of the call; and means for assigning the call to an agent of the expanded group based upon first availability.

11. The apparatus for assigning agents as in claim 10 further comprising means for assigning the call to an agent with a longest period of inactivity when two or more agents of the expanded group become available simultaneously.

12. The apparatus for assigning agents as in claim 10 further comprising means for assigning the call to an agent with a highest relative skill level in handling a call classification of the call when two or more agents of the expanded group become available simultaneously.

13. The apparatus for assigning agents as in claim 10 further comprising means for measuring the time delay as being a time interval measured between a current time and a time of call arrival of the call from the public switched telephone network.

14. The apparatus for assigning agents as in claim 10 wherein the means for forming the expanded group further comprising means for comparing the time delay with the first threshold.

15. The apparatus for assigning agents as in claim 10 further comprising means for further expanding the expanded group of the first and second tiers of agents of the first group to include at least some agents of a third tier of agents of the first group when the time delay exceeds a second threshold.

16. The apparatus for assigning agents as in claim 15 further comprising means for assigning the call to a first available agent of the further expanded group.

17. The apparatus for assigning agents as in claim 16 further comprising means for assigning the call to an agent with a longest period of inactivity when two or more agents of the further expanded group become available simultaneously.

18. The apparatus for assigning agents as in claim 16 further comprising means for assigning the call to an agent with a highest relative skill level in handling a call classification of the call when two or more agents of the further expanded group become available simultaneously.

19. An apparatus for assigning agents of a plurality of agents and agent groups for answering a call based upon a time delay in answering the call, such apparatus comprising:

an assignment matrix adapted to identify agents for handling the call, the assignment matrix having a plurality of agent identifiers disposed along an ordinate of the matrix and a plurality of application numbers disposed along an abscissa of the matrix where each application number of the plurality of application numbers identifies a call handling routine used to process a corresponding call classification and wherein each column directly below an identifier of an application number of the plurality of application numbers defines a tier number for each agent of the plurality of agents;

a call classifier adapted to designate a first group of agents within the assignment matrix as candidates for answering the call based upon first availability where the first group of agents are defined by a tier number of one for the call handling routine of the call;

a comparator adapted to form an expanded group of the first group and at least some agents of a second group when the time delay exceeds a first threshold where the second group of agents are defined by a tier number of two for the call handling routine of the call; and a routing processor adapted to assign the call to an agent of the expanded group based upon first availability.

20. The apparatus for assigning agents as in claim 19 further comprising an agent activity processor adapted to assign the call to an agent with a longest period of inactivity when two or more agents of the expanded group become available simultaneously.

21. The apparatus for assigning agents as in claim 19 further comprising a skill matrix adapted to assign the call to an agent with a highest relative skill level in handling a call classification of the call when two or more agents of the expanded group become available simultaneously.

22. The apparatus for assigning agents as in claim 19 further comprising a timer adapted to measure the time delay as being a time interval measured between a current time and a time of call arrival from the public switched telephone network.

23. The apparatus for assigning agents as in claim 19 wherein the agent matrix further comprising a comparator adapted to compare the time delay with the first threshold.

* * * * *